United States Patent
Le et al.

(10) Patent No.: US 10,911,691 B1
(45) Date of Patent: Feb. 2, 2021

(54) SYSTEM AND METHOD FOR DYNAMIC SELECTION OF REFERENCE IMAGE FRAME

(71) Applicant: Samsung Electronics Co., Ltd., Suwon-si (KR)

(72) Inventors: Long N. Le, Richardson, TX (US); Ruiwen Zhen, Allen, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/719,633

(22) Filed: Dec. 18, 2019

Related U.S. Application Data

(60) Provisional application No. 62/937,321, filed on Nov. 19, 2019.

(51) Int. Cl.
*H04N 5/235* (2006.01)
*G06T 5/40* (2006.01)
(Continued)

(52) U.S. Cl.
CPC .......... *H04N 5/2355* (2013.01); *G06T 5/002* (2013.01); *G06T 5/40* (2013.01); *G06T 5/50* (2013.01); *H04N 5/2353* (2013.01)

(58) Field of Classification Search
CPC .... H04N 5/2355; H04N 5/2353; G06T 5/002; G06T 5/40; G06T 5/50
(Continued)

(56) References Cited

U.S. PATENT DOCUMENTS

| 7,443,443 B2 | 10/2008 | Raskar et al. |
| 7,962,030 B2 | 6/2011 | Trevelyan |
(Continued)

FOREIGN PATENT DOCUMENTS

| JP | 2007228099 A | 9/2007 |
| JP | 2012119840 A | 6/2012 |
(Continued)

OTHER PUBLICATIONS

Swathi et al., "Satellite Image Co-Registration Based on Hybrid Invariant Local Features", Journal of Theoretical and Applied Information Technology, vol. 95, No. 15, Aug. 2017, 9 pages.
(Continued)

*Primary Examiner* — Pritham D Prabhakher

(57) ABSTRACT

A method includes obtaining, using at least one image sensor of an electronic device, multiple image frames of a scene. The multiple image frames include a plurality of short image frames at a first exposure level and a plurality of long image frames at a second exposure level longer than the first exposure level. The method also includes generating a short reference image frame and a long reference image frame using the multiple image frames. The method further includes selecting, using a processor of the electronic device, the short reference image frame or the long reference image frame as a reference frame, where the selection is based on an amount of saturated motion in the long image frame and an amount of a shadow region in the short image frame. In addition, the method includes generating a final image of the scene using the reference frame.

20 Claims, 12 Drawing Sheets

(51) Int. Cl.
*G06T 5/00* (2006.01)
*G06T 5/50* (2006.01)

(58) Field of Classification Search
USPC .................................................. 348/229.1
See application file for complete search history.

(56) References Cited

U.S. PATENT DOCUMENTS

| | | | |
|---|---|---|---|
| 8,866,922 B2 | 10/2014 | Tsubaki et al. | |
| 8,913,153 B2* | 12/2014 | Li | H04N 5/35536 348/222.1 |
| 8,953,094 B2 | 2/2015 | Baer | |
| 9,081,257 B2 | 7/2015 | Miyazaki | |
| 9,117,134 B1* | 8/2015 | Geiss | G06T 5/40 |
| 9,240,038 B2 | 1/2016 | Chen et al. | |
| 9,317,909 B2 | 4/2016 | Kim et al. | |
| 9,438,809 B2 | 9/2016 | Sheikh et al. | |
| 9,456,144 B2 | 9/2016 | Miyazaki | |
| 9,571,745 B2 | 2/2017 | Mahowald | |
| 9,648,248 B2* | 5/2017 | Gupta | H04N 5/2352 |
| 10,097,765 B2 | 10/2018 | Sheikh et al. | |
| 2004/0100565 A1 | 5/2004 | Chen et al. | |
| 2008/0192131 A1 | 8/2008 | Kim et al. | |
| 2013/0028509 A1* | 1/2013 | Moon | G06T 5/009 382/162 |
| 2013/0100314 A1* | 4/2013 | Li | H04N 5/2355 348/229.1 |
| 2015/0092079 A1* | 4/2015 | Li | H04N 5/2355 348/222.1 |
| 2015/0350509 A1* | 12/2015 | Tico | H04N 5/2355 348/362 |
| 2017/0201692 A1 | 7/2017 | Wu | |
| 2019/0253602 A1* | 8/2019 | Lee | H04N 5/35527 |
| 2019/0305018 A1* | 10/2019 | Price | H04N 5/3535 |
| 2019/0370948 A1* | 12/2019 | Tico | G06K 9/46 |
| 2020/0099840 A1* | 3/2020 | Nishio | H04N 5/23254 |
| 2020/0221007 A1* | 7/2020 | Kenjo | H04N 5/2327 |
| 2020/0265567 A1* | 8/2020 | Hu | G06T 5/50 |
| 2020/0267300 A1* | 8/2020 | Zhen | G06T 7/44 |
| 2020/0267339 A1* | 8/2020 | Douady-Pleven | H04N 19/176 |

FOREIGN PATENT DOCUMENTS

| | | |
|---|---|---|
| JP | 2016019196 A | 2/2016 |
| JP | 6333095 B2 | 5/2018 |
| KR | 1020080076004 A | 8/2008 |
| KR | 1020130031574 A | 3/2013 |
| KR | 101633893 B1 | 6/2016 |
| KR | 20160127606 A | 11/2016 |

OTHER PUBLICATIONS

Li et al., "An Improved FAST+SURF Fast Matching Algorithm", Procedia Computer Science 107, International Congress of Information and Communication Technology, 2017, 7 pages.

Li et al., "Multi-exposure high dynamic range image synthesis with camera shake corrections", Proceedings of SPIE, Applied Optics and Photonics China, 2017, 6 pages.

Le et al., "Apparatus and Method for Capturing and Blending Multiple Images for High-Quality Flash Photography Using Mobile Electronic Device", U.S. Appl. No. 16/278,543, filed Feb. 18, 2019, 59 pages.

Zhen et al., "System and Method for Compositing High Dynamic Range Images", U.S. Appl. No. 16/277,630, filed Feb. 15, 2019, 52 pages.

Duan et al., "Tone-mapping High Dynamic Range Images by Novel Histogram Adjustment", School of Electrical Engineering and Computer Science, Kyungpook National Univ., 2010, 39 pages.

* cited by examiner

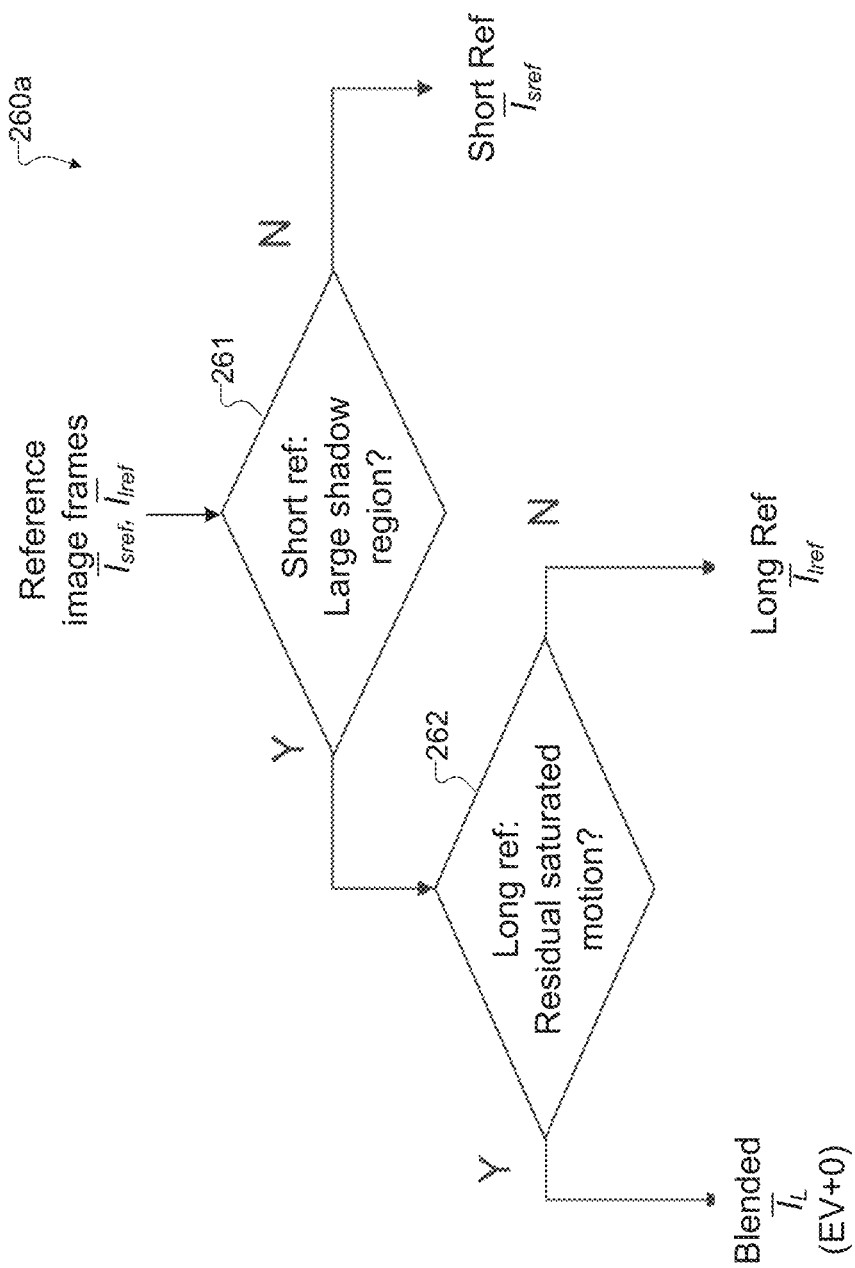

SYSTEM AND METHOD FOR DYNAMIC SELECTION OF REFERENCE IMAGE FRAME

CROSS-REFERENCE TO RELATED APPLICATION AND PRIORITY CLAIM

This application claims priority under 35 U.S.C. § 119(e) to U.S. Provisional Patent Application No. 62/937,321 filed on Nov. 19, 2019, which is hereby incorporated by reference in its entirety.

TECHNICAL FIELD

This disclosure relates generally to image capturing systems. More specifically, this disclosure relates to a system and method for dynamic selection of a reference image frame.

BACKGROUND

Many mobile electronic devices, such as smartphones and tablet computers, include cameras that can be used to capture still and video images. While convenient, cameras on mobile electronic devices typically suffer from a number of shortcomings. For example, cameras on mobile electronic devices often capture images with ghost artifacts or limited sharpness, such as when capturing images with motion and high saturation. This is typically because image sensors in the cameras have limited dynamic range. It is possible to capture multiple image frames of a scene and then combine the "best" parts of the image frames to produce a blended image. However, producing a blended image from a set of image frames with different exposures is a challenging process, especially for dynamic scenes.

SUMMARY

This disclosure provides a system and method for dynamic selection of a reference image frame.

In a first embodiment, a method includes obtaining, using at least one image sensor of an electronic device, multiple image frames of a scene. The multiple image frames include a plurality of short image frames at a first exposure level and a plurality of long image frames at a second exposure level longer than the first exposure level. The method also includes generating a short reference image frame and a long reference image frame using the multiple image frames. The method further includes selecting, using a processor of the electronic device, the short reference image frame or the long reference image frame as a reference frame, where the selection is based on an amount of saturated motion in the long image frame and an amount of a shadow region in the short image frame. In addition, the method includes generating a final image of the scene using the reference frame.

In a second embodiment, an electronic device includes at least one image sensor and at least one processing device. The at least one processing device is configured to obtain, using the at least one image sensor, multiple image frames of a scene. The multiple image frames include a plurality of short image frames at a first exposure level and a plurality of long image frames at a second exposure level longer than the first exposure level. The at least one processing device is also configured to generate a short reference image frame and a long reference image frame using the multiple image frames. The at least one processing device is further configured to select the short reference image frame or the long reference image frame as a reference frame, where the selection is based on an amount of saturated motion in the long image frame and an amount of a shadow region in the short image frame. In addition, the at least one processing device is configured to generate a final image of the scene using the reference frame.

In a third embodiment, a non-transitory machine-readable medium contains instructions that when executed cause at least one processor of an electronic device to obtain multiple image frames of a scene that are captured using at least one image sensor of the electronic device. The multiple image frames include a plurality of short image frames at a first exposure level and a plurality of long image frames at a second exposure level longer than the first exposure level. The medium also contains instructions that when executed cause the at least one processor to generate a short reference image frame and a long reference image frame using the multiple image frames. The medium further contains instructions that when executed cause the at least one processor to select the short reference image frame or the long reference image frame as a reference frame, where the selection is based on an amount of saturated motion in the long image frame and an amount of a shadow region in the short image frame. In addition, the medium contains instructions that when executed cause the at least one processor to generate a final image of the scene using the reference frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 2A, 2B, 2C, 2D, 2E, 2F, 2G, 2H, and 2I illustrate an example process for dynamic selection of a reference image frame in accordance with this disclosure;

DETAILED DESCRIPTION

FIGS. 1 through 4, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. However, cameras on mobile electronic devices typically suffer from a number of shortcomings. For example, high dynamic range (HDR) is an important camera feature to extend the dynamic range on handheld devices. Unfortunately, in areas of high saturation, HDR may result in images that exhibit ghost artifacts when a scene includes a moving object, such as a waving hand. Also, in some HDR scenes, there may be limited recovery of certain elements of a scene due to use of a single image frame as a reference.

This disclosure provides techniques for dynamic selection of a reference image frame that can be used in various image processing applications, such as HDR imaging. As described in more detail below, a robust framework is provided for dynamically switching between "short" and "long" reference image frames, where "short" and "long" here refer to exposures. Among other things, use of a short reference image frame can eliminate saturated motion ghosts. However, when saturated motion is not an issue and minimization of noise is desired, a long reference image frame can be used. Additionally, the disclosed embodiments can reduce motion noise by increasing the exposure and reducing the gain of the short reference image frame as compared to a regular short image frame. Increasing the exposure time and reducing the gain for the short reference image frame help lower noise while keeping the exposure level the same.

Note that while the techniques described below are often described as being performed using a mobile electronic device, other electronic devices could also be used to perform or support these techniques. Thus, these techniques could be used in various types of electronic devices. Also, while the techniques described below are often described as processing image frames when capturing still images of a scene, the same or similar approaches could be used to support the capture of video images.

Figure 1:
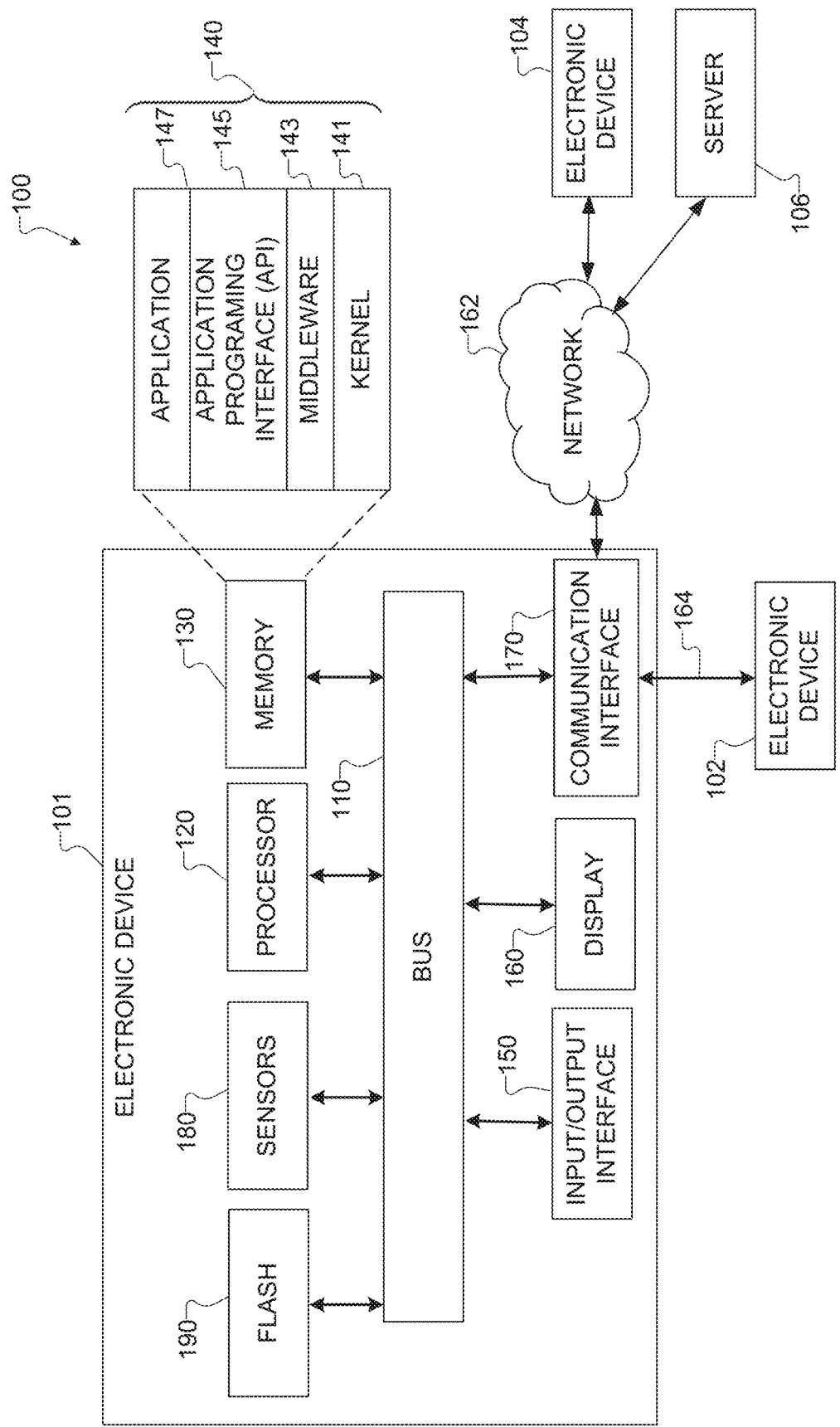
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data and can process the image data (as discussed in more detail below) to dynamically select a reference image frame that can be used for further image processing.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 processes data using a multi-task fusion neural network architecture to perform multiple tasks using the data as described below. In particular embodiments, the server 106 processes image data using the multi-task fusion neural network architecture to perform multiple tasks using the image data and generate images of scenes.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2A, 2B, 2C, 2D, 2E, 2F, 2G, 2H, and 2I illustrate an example process for dynamic selection of a reference image frame in accordance with this disclosure. For ease of explanation, the process 200 is described as being performed using the electronic device 101 shown in FIG. 1. However, the process 200 could be used with any other suitable electronic device and in any suitable system.

Figure 2A:
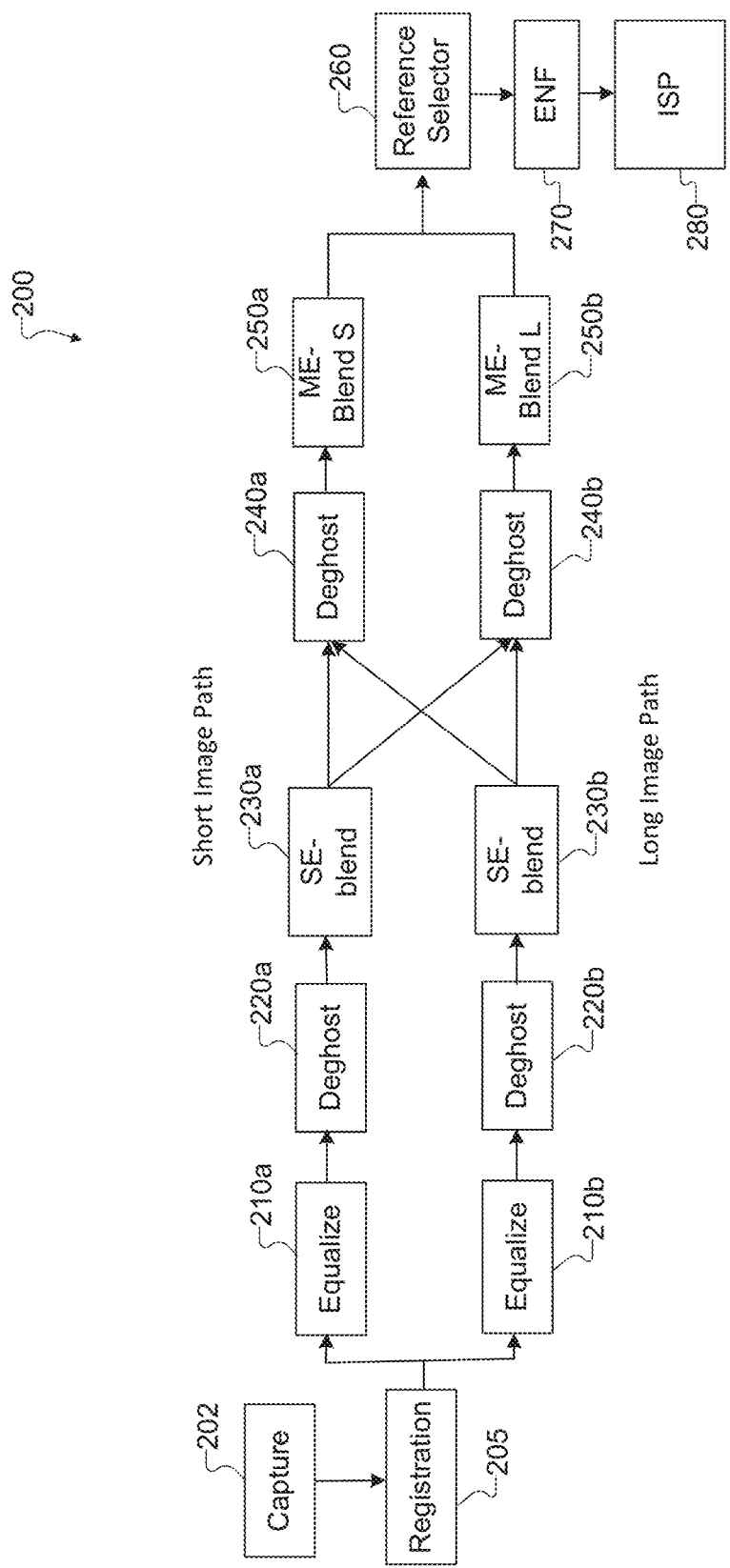

As shown in FIG. 2A, the electronic device 101 captures multiple image frames of a scene in a burst capture operation 202. The capture operation 202 may be performed in response to an event, such as a user actuating a shutter control. In some embodiments, multiple image frames are captured using one image sensor 180 of the electronic device 101, such as a camera. In other embodiments, multiple image frames are captured using multiple image sensors 180 of the electronic device 101, such as multiple cameras, in which case each image sensor 180 may capture one image or multiple images.

In some embodiments, the captured image frames represent Bayer image frames, rather than other types of image frames (such as YUV image frames). In these embodiments, Bayer image frames may retain linearity properties that can be lost in YUV image frames after the image frames are processed through an image signal processor (ISP), and this linearity can be useful in subsequent processing. The captured image frames include frames captured using different exposures. For example, some of the image frames may be captured at a relatively short exposure (such as EV−3 or EV−2) and are referred to as short image frames. Other image frames may be captured at a relatively long exposure (such as EV+0) and are referred to as long image frames.

Some of the short image frames may exhibit areas with an undesirable amount of noise. For static regions of a scene, a common strategy to reduce noise is to blend multiple short image frames together. However, for dynamic or motion regions of a scene, blending is generally less advantageous (even with the assistance of local alignment) due to the risk of creating "ghost" artifacts. Aggressive spatial filtering can reduce the noise but also inherently hides dark details. To address noisy motion regions with a minimal loss of details (motion noise reduction), the electronic device 101 can select one of the short image frames and increase the exposure time of the selected short image frame by a factor of A while reducing the ISO gain of the selected short image frame by a factor of 1/A. This helps to maintain the short exposure level. In some embodiments, A may represent a power of two (such as 2, 4, 8, etc.). This functionality is summarized in Table 1.

TABLE 1

Adjustment to the selected short frame to reduce noise in motion area, where A = 2, 4, 8, . . .

| Parameter | Selected short image frame | Regular short image frame |
|---|---|---|
| Exposure Time | A× | 1× |
| ISO Gain | 1/A× | 1× |

These operations can be performed to improve the quality of the selected short image frame. The selected short image frame with improved quality can later be used as a short reference image frame for deghosting and blending as discussed in greater detail below.

After the image capture operation 202, the electronic device 101 performs a registration operation 205 to align the captured image frames. Registration generally refers to aligning different image frames so that common points in the image frames are aligned. This may be useful or desirable since later blending operations may be most successful when the image frames are well-aligned. Thus, one objective of the registration operation 205 is to ensure that the image frames are aligned even in the presence of camera motion. To achieve this, the electronic device 101 examines the captured image frames for static elements that are common among the image frames and aligns the image frames according to features of those static elements.

In some embodiments, the registration operation 205 may be performed as follows. The electronic device 101 can equalize the multi-exposure image frames to the same exposure level, such as EV+0. This can be done to increase the number of matched key points between image frames and thereby provide a more reliable homography estimate in later steps. Since Bayer image frames are linear, exposure equalization here may simply involve performing a scaling operation, where the scaling factor is determined by the number of EV stops. Appropriate capping after scaling can be used to reduce the number of keypoints with no matches or with wrong matches. The electronic device 101 then extracts luminance components from the image frames and performs keypoint detection and descriptor extraction on the luminance components. Based on the obtained keypoints, the electronic device 101 estimates a homography to warp other image frames to a selected base image frame. Any image frame can be selected here as the base image frame since the goal of the registration operation 205 is to align the frames that are potentially misaligned, such as due to camera motion.

After the registration operation 205, the electronic device 101 separates the aligned image frames into two groups (namely short and long) and performs multiple subsequent operations in separate paths for the two image groups as shown in FIG. 2A. Generally, the short image frames should exhibit better clarity in saturated areas of a scene, while the long image frames should have better details in dark areas of the scene.

In this example, the electronic device 101 performs an equalization operation 210a on the short image frames and performs an equalization operation 210b on the long image frames. The equalization operations 210a-210b are performed to bring the short image frames and the long image frames to the same brightness level. In some embodiments, the equalization operation 210a includes bringing the short image frames to the brightness level of the long image frames. For example, if the long image frames have an exposure level of EV+0 and the short image frames have an exposure level of EV-3, the exposure difference can be defined as $EV_{diff}=2^3=8$. Thus, the brightness level of each short image frame can be multiplied by eight to bring the brightness level of the short image frames closer to the brightness level of the long image frames. It is noted that when the short image frames are brought to the brightness level of the long image frames, the brightness level of the long image frames does not need to be equalized, and the equalization operation 210b for the long image frames can be trivial (such as "multiply by one") or omitted. In other embodiments, the equalization operations 210a-210b could be performed to bring the short and long image frames to an intermediate brightness level.

Figure 2B:
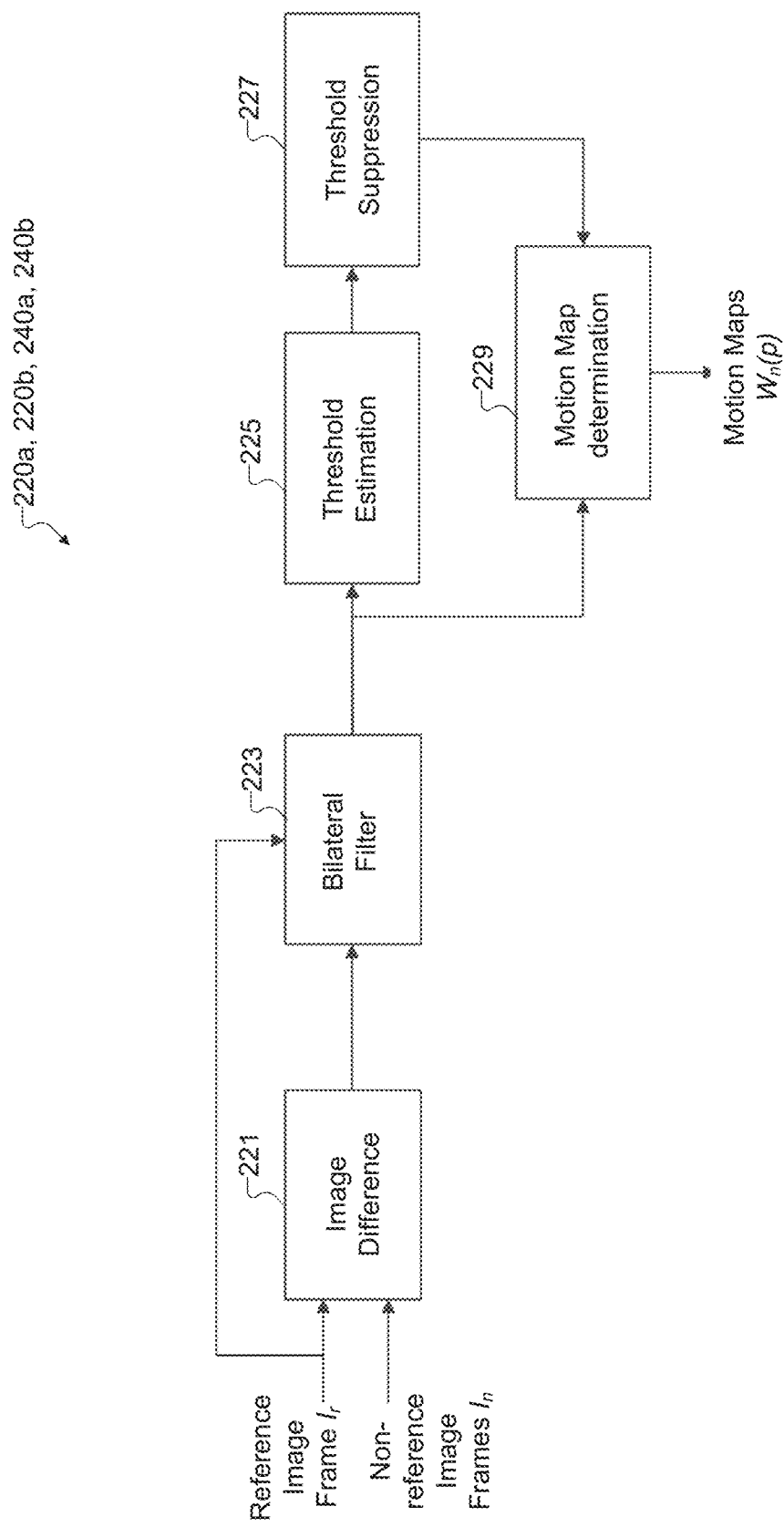

After the equalization operations 210a-210b, the electronic device 101 performs deghosting operations 220a-220b. The deghosting operations 220a-220b are performed to identify motion regions among the image frames so that blending in those regions can be suppressed. This is useful since blending in motion regions can lead to ghost artifacts. The deghosting operations 220a-220b can be performed in any suitable manner. FIG. 2B illustrates one example implementation of the deghosting operations 220a-220b in greater detail. Although the process shown in FIG. 2B represents one example process for deghosting, other deghosting processes can be used and are within the scope of this disclosure.

As shown in FIG. 2B, the inputs into each deghosting operation 220a-220b include two equalized image frames $I_i$. For the deghosting operation 220a, the equalized image frames $I_i$ include the short image frames equalized in the equalization operation 210a. For the deghosting operation 220b, the equalized image frames $I_i$ include the long image frames equalized in the equalization operation 210b. In each case, one of the image frames $I_i$ is selected as a reference image frame $I_r$, and the other image frame or frames are designated as non-reference image frames $I_n$. For same-exposure image frames (all long image frames or all short image frames), any image frame can be chosen as the reference image frame $I_r$ without loss of generality. The outputs of the deghosting operations 220a-220b are weighted motion maps $W_i$, which in some embodiments have values in the range [0, 1]. For the reference image frame $I_r$, the motion map may be trivial, such as when $W_r(p)=1$ for all pixels p.

For non-reference image frames $I_n$, the motion map may be determined as follows in some embodiments. The electronic device 101 performs an image difference function 221 to compute the differences between a non-reference image frame $I_n$ and the reference image frame $I_r$, ignoring pixels where both frames are saturated since there is no reliable information there for motion analysis. In some cases, the difference signal can be computed according to the following:

$$D=(1-S_N\cdot S_r)(I_N \ominus I_r) \quad (1)$$

where reference and non-reference saturated regions $S_n$ and $S_r$ are declared pixel-wise when the maximum value across multiple channels (such as the Bayer channels Gr, Gb, R, B) exceeds a predetermined saturation threshold $\tau_s$. This can be expressed as follows:

$$S_i(p) = \max_{Gr,Gb,R,B} [I_i(p)] > \tau_s \quad (2)$$

The operator $\ominus$ represents the total absolute difference across the multiple channels. This can be expressed as follows:

$$I_N \ominus I_r(p) \triangleq \Sigma_{Gr,Gb,R,B} |I_n(p)-I_r(p)| \quad (3)$$

Motion in dark regions of image frames can be missed since the difference signal tends to be small there. To reduce the miss rate of motion detection, locality information can be used. That is, it is observed that moving pixels are locally similar. Thus, a stronger difference signal (indicating a higher likelihood of motion) can be obtained by propagating strong difference signals from neighboring similar pixels. To this end, the electronic device 101 may apply a bilateral filter function 223 to generate a filtered difference image. The filtering can be guided by the reference image frame $I_r$ and applied on the difference signal in Equation (1). In some cases, the difference signal can be expressed by:

$$D_f(p) = \max\{D(p), \Sigma_q H_{pq} D(q)\} \quad (4)$$

where:

$$H_{pq} \triangleq \frac{1}{N} \exp\left(-\frac{\|x_p - x_q\|^2}{2\sigma_x^2}\right) \exp\left(-\frac{\|I_r(p) - I_r(q)\|^2}{2\sigma_I^2}\right) \quad (5)$$

Here, N represents a normalization factor used to ensure that filter weights sum to one, $x_p$ represents the image coordinate of pixel p, q represents a neighboring pixel of p, and $\sigma_x$ and $\sigma_I$ represent domain and range standard deviations. The reference image frame $I_r$ is used for guidance since motion pixels are pulled from the reference image frame $I_r$.

After the filtered difference image is determined, the electronic device 101 performs a threshold estimation function 225 to compute a constant false-alarm rate (CFAR) difference threshold ID for classifying motion and non-motion. Since the value of the difference signal can be scene-dependent, it can be difficult to set a reliable fixed threshold. Instead, it is observed that the percentage of moving pixels between frames in a burst capture is relatively small. Thus, the threshold can be automatically set based on a percentile of all difference signals $D_f$ in a scene, excluding pixels with zero difference. The standard deviation on the threshold $\sigma_{\tau D}$ can be set to the difference value that is a few percentiles below the threshold TD for the subsequent conversion to a soft motion map.

The electronic device 101 can also perform a threshold suppression function 227 to further reduce the threshold in shadow regions of both reference and non-reference image frames to improve motion detection. For example, in the threshold suppression function 227, the electronic device 101 may average multiple channel values (such as Gr, Gb, R, and B values) for both the reference and non-reference image frames, generate a luminance map, and multiply the luminance map by the difference threshold to determine the threshold suppression. In some cases, the threshold suppression can be expressed as follows:

$$\tau_{Ds}(p) = \frac{\tau_D}{2\tau_d} \min(2\tau_a, \text{mean}_{Gr,Gb,R,B}[I_n(p)] + \text{mean}_{Gr,Gb,R,B}[I_r(p)]) \quad (6)$$

where $\tau_D$ represents the shadow threshold.

The electronic device 101 then performs a motion map determination function 229 to determine a non-reference motion map $W_n(p)$ for each non-reference image frame. In some embodiments, this occurs by converting the difference signal to a soft decision on motion/non-motion, such as based on a sigmoid model. In some cases, the motion maps can be determined according to the following:

$$W_n(p) = \frac{1}{1 + \exp\frac{D_f(p) - \tau_{Ds}(p)}{\sigma_{\tau D}}} \quad (7)$$

Depending on the implementation, small pixel values (such as close to 0) indicate motion, while large pixel values (such as close to 1) indicate static areas. Of course, this is merely one example. In other embodiments, smaller values could indicate static areas, while larger values could indicate motion.

Returning to FIG. 2A, after the deghosting operations 220a-220b, the electronic device 101 can perform same exposure (SE) blending operations 230a-230b to generate same-exposure blended image frames. For example, the electronic device 101 can blend the multiple short image frames using the SE blending operation 230a to generate a single blended short image frame. Similarly, the electronic device 101 can blend the multiple long image frames using the SE blending operation 230b to generate a single blended long image frame. In the blending operations 230a-230b, the electronic device 101 respectively uses the motion maps $W_i$ from the deghosting operations 220a-220b to guide the blending. In some cases, the blending can be expressed according to the following:

$$\bar{I}_* = \frac{\Sigma_i W_i \cdot I_i}{\Sigma_i W_i}, \quad *=S, L \qquad (8)$$

where $\bar{I}_*$, *=S, L represents the single-exposure blended short and long image frames, respectively.

Once the blended short and long image frames are generated in the blending operations 230a-230b, the electronic device 101 can perform deghosting operations 240a-240b to generate blended motion maps $W_S$ and $W_L$ for the blended short image frame and the blended long image frame, respectively. The deghosting operations 240a-240b may be the same as or similar to the deghosting operations 220a-220b, and reference can be made to FIG. 2B for further details of the process in some embodiments. However, the deghosting operations 240a-240b differ from the deghosting operations 220a-220b in their inputs. That is, the deghosting operations 220a-220b receive image frames having the same exposure (either short image frames or long image frames) as inputs. In contrast, the deghosting operations 240a-240b receive image frames having different exposures (long image frames and short image frames) as inputs. In particular, the deghosting operations 240a-240b receive as inputs both the blended short image frame from the SE blending operation 230a and the blended long image frame from the SE blending operation 230b. The output of the deghosting operation 240a is the short blended motion map $W_S$, and the output of the deghosting operation 240b is the long blended motion map $W_L$.

After the blended motion maps are generated in the deghosting operations 240a-240b, the electronic device 101 can perform multi-exposure (ME) blending operations 250a-250b. In ME blending, there is a difference in the noise levels, meaning the blended long image frame typically has lower noise than the blended short image frame. Thus, it may be desirable to minimize the mixing between the two. Furthermore, the blending policy for ME blending may consider not only the motion maps but also saturation areas. Depending on whether the same-exposure blended short image frame or the same-exposure long image frame from the SE blending operations 230a-230b is chosen as a primary image (or reference image), the blending policy may be different.

Accordingly, the electronic device 101 can perform the ME blending operation 250a in which the same-exposure blended short image frame is the primary image and the same-exposure blended long image frame is the secondary image. The output of the ME blending operation 250a is a ME blended short reference image frame. In some embodiments, the ME blending operation 250a can be performed according to the following.

$$\bar{I}_{sref}=\bar{I}_S \cdot (1-B_L)+\bar{I}_L \cdot B_L \qquad (9)$$

where $\bar{I}_{sref}$ represents the ME blended short reference image frame, $\bar{I}_S$ represents the same-exposure blended short image frame, $\bar{I}_L$ represents the same-exposure blended long image frame, and $B_L$ represents a blend weight. In some cases, the blend weight $B_L$ can be computed according to:

$$B_L=W_L \cdot (1-S_L) \qquad (10)$$

where $W_L$ represents the motion map for the blended long image frame, and $S_L$ represents the saturation map for the blended long image. Note that $W_S(p)=1$, $\forall p$ in a short reference system. According to Equation (10), $B_L$ is small in both motion and saturation regions of $\bar{I}_L$, resulting in content from the blended short image frame $\bar{I}_S$ in those regions.

Similarly, the electronic device 101 can perform the ME blending operation 250b in which the same-exposure blended long image frame is the primary image and the same-exposure blended short image frame is the secondary image. The output of the ME blending operation 250b is a ME blended long reference image frame. In some embodiments, the ME blending operation 250b can be performed according to the following.

$$\bar{I}_{lref}=\bar{I}_S \cdot B_S+(C \cdot S_L+\bar{I}_L \cdot (1-S_L)) \cdot (1-B_S) \qquad (11)$$

where $\bar{I}_{lref}$ represents the ME blended long reference image frame, $\bar{I}_S$ represents the same-exposure blended short image frame, $\bar{I}_L$ represents the same-exposure blended long image frame, $B_S$ represents a blend weight, $S_L$ represents the saturation map for the blended long image, and C represents a constant that is chosen as explained below. In some cases, the blend weight $B_S$ can be computed according to:

$$B_S=h(W_S \cdot S_L) \qquad (12)$$

where $W_S$ represents the motion map for the blended short image frame, and $S_L$ represents the saturation map for the blended long image frame. Note that $W_L(p)=1$, $\forall p$ in a long reference system. The operator $h(\cdot)$ here represents a non-linear filtering operation and can be defined as follows in some cases:

$$h(W_S \cdot S_L) \triangleq W_S \cdot S_L+(U-U_f) \cdot S_L \qquad (13)$$

where $$U \triangleq (1-W_S \cdot S_L) \cdot S_L$$

and $U_f$=open(U), meaning an open morphology filtering on U According to Equation (12) and ignoring the non-linear filtering $h(\cdot)$ for the moment, the blend weight $B_S$ is large only in static saturation regions of $\bar{I}_L$, resulting in content from the blended short image frame $\bar{I}_S$ only in those regions. Hence, there exist saturation regions in $\bar{I}_L$ that are not filled by $\bar{I}_S$ due to motions, denoted by U in Equation (13). Since there is not information to fill in those regions, they can be made up, and a simple choice is a constant C. Furthermore, the U regions can be minimized, such as via morphological filtering, to reduce the amount of required make-up information.

Figure 2D:
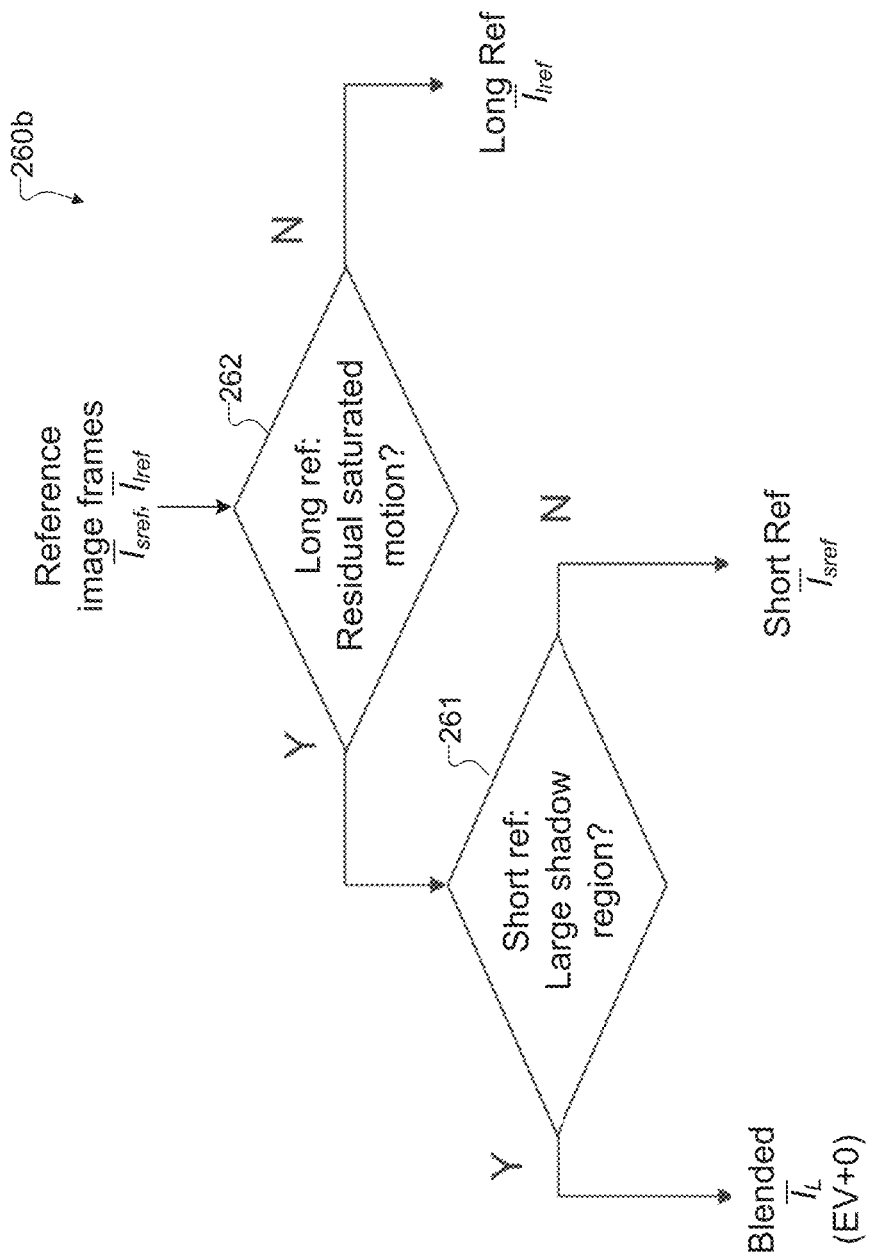

As discussed above, the electronic device 101 performs the ME blending operations 250a-250b to generate the ME blended short reference image frame $\bar{I}_{sref}$ and the ME blended long reference image frame $\bar{I}_{lref}$, respectively. The electronic device 101 then performs a reference selection operation 260 to select one of the reference image frames $\bar{I}_{sref}$ and $\bar{I}_{lref}$ to be used as a reference frame for further image processing. Various techniques may be used to perform the reference selection operation 260. FIGS. 2C and 2D illustrate two example processes 260a and 260b that may be performed as the reference selector operation 260 in greater detail.

Figure 2E:
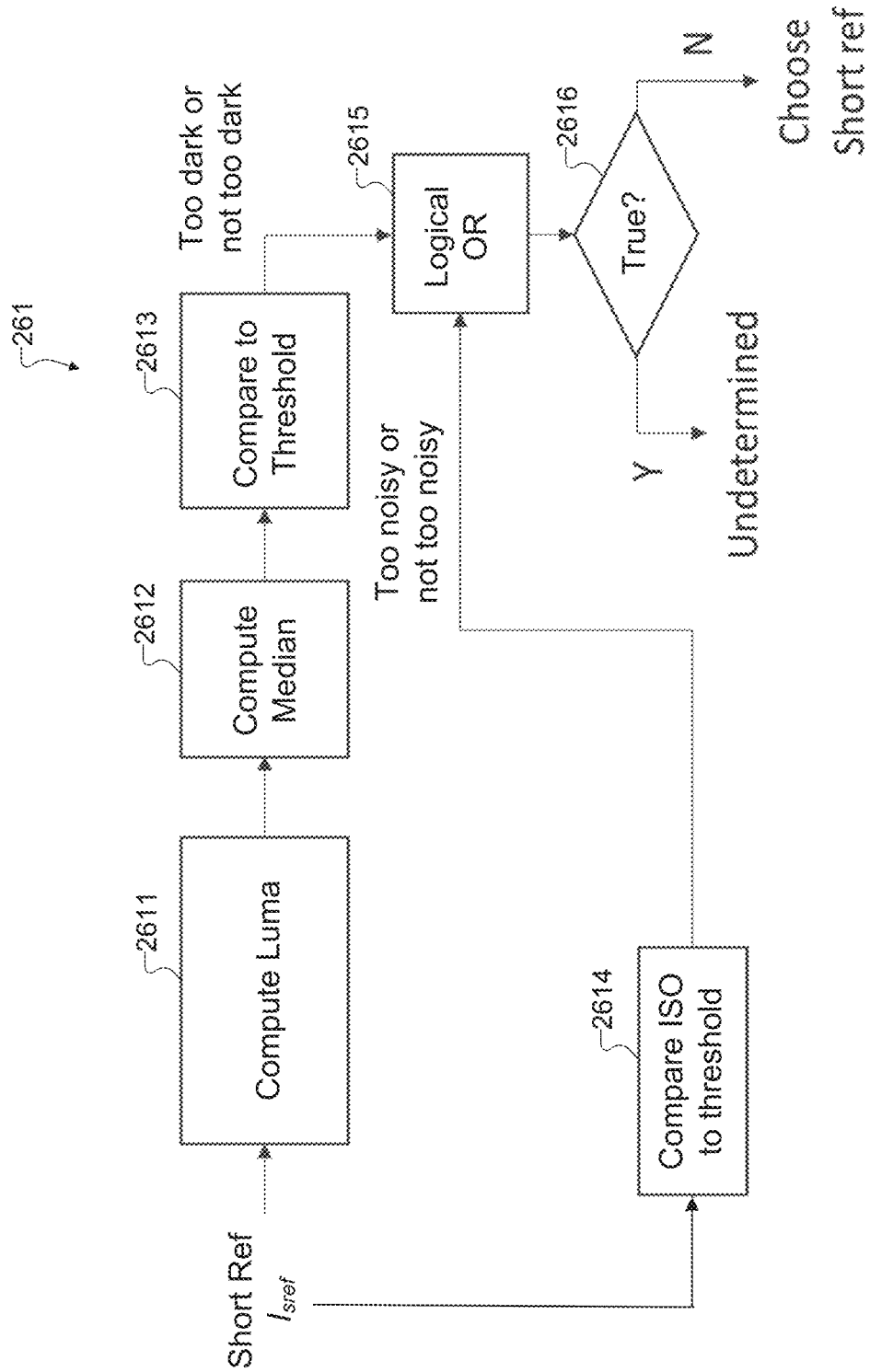

As shown in FIG. 2C, the electronic device 101 starts the process 260a by obtaining the short and long reference image frames $\bar{I}_{sref}$ and $\bar{I}_{lref}$. The electronic device 101 performs a large shadow region test 261 to check for the existence of large shadow regions in the short reference image frame $\bar{I}_{sref}$. Various techniques may be used to perform the large shadow region test 261. FIG. 2E illustrates one example implementation of the large shadow region test 261 in greater detail. As shown in FIG. 2E, the electronic device 101 takes the short reference image frame $\bar{I}_{sref}$ and, at step 2611, computes the luminance values from the entire frame $\bar{I}_{sref}$. In some cases, this can be performed according to the following:

$$\text{Luma} = 0.213*R + 0.715*G + 0.072*B \quad (14)$$

where R, G, and B represent red, green, and blue channels, respectively, of each pixel. In some embodiments, this provides luminance values in a range of 0-255. Of course, this is merely one example, and other luminance equations could be used to generate luminance values in different ranges.

At step 2612, the electronic device 101 determines the median luminance value of the luminance values across the image frame. Here, the median luminance value corresponds to the value which 50% of the luminance values are above and 50% of the luminance values are below. At step 2613, the electronic device 101 determines if the median luminance value is less than a predetermined threshold value (such as 50). If so, the short reference image frame $\bar{I}_{sref}$ is considered to be too dark. If not, the short reference image frame $\bar{I}_{sref}$ is considered to be not too dark. At step 2614, the electronic device 101 takes the ISO value of the short reference image frame $\bar{I}_{sref}$ and determines whether the ISO value is greater than a predetermined threshold value (such as 4000). If the ISO value is greater than the threshold, the short reference image frame $\bar{I}_{sref}$ is considered to be too noisy. If not, the short reference image frame $\bar{I}_{sref}$ is considered to be not too noisy.

At step 2615, the electronic device 101 takes a logical OR of the determinations from steps 2613 and 2614 to determine whether the short reference image frame $\bar{I}_{sref}$ is considered to be too dark or too noisy. At step 2616, if the short reference image frame $\bar{I}_{sref}$ is not too dark and not too noisy, it is considered that a large shadow region does not exist in the short reference image frame $\bar{I}_{sref}$, and thus the short reference image frame $\bar{I}_{sref}$ can be used as the reference image frame. Otherwise, if the short reference image frame $\bar{I}_{sref}$ is too dark, too noisy, or both, it is considered that a large shadow region exists in the short reference image frame $\bar{I}_{sref}$, and the short reference image frame $\bar{I}_{sref}$ is not suitable for use as the reference image frame. The next operation depends on whether the process 260a or the process 260b is being performed for the reference selection operation 260.

Figure 2F:
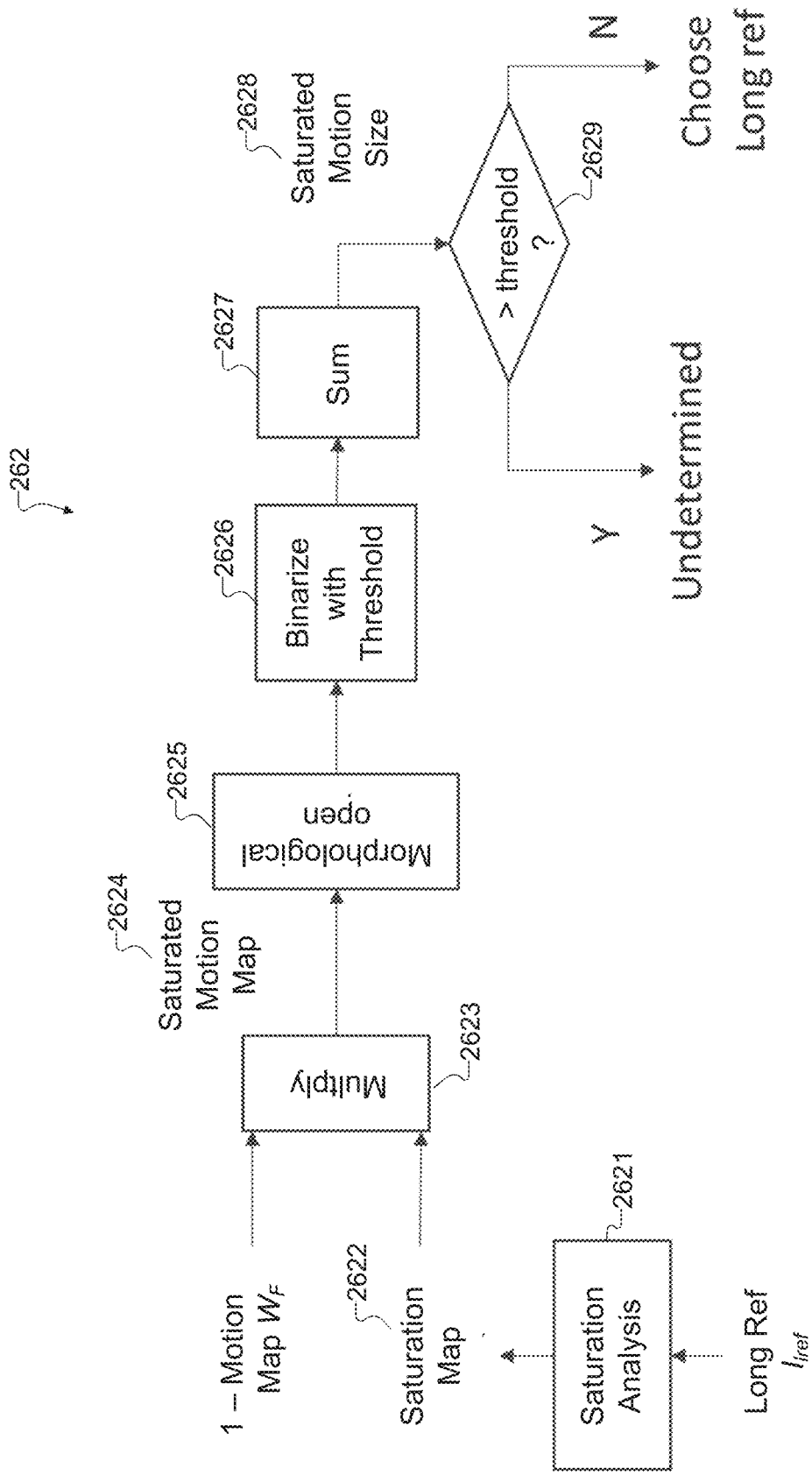

Returning to FIG. 2C, in the process 260a, if a large shadow region does not exist in the short reference image frame $\bar{I}_{sref}$, the short reference image frame $\bar{I}_{sref}$ can be used as the reference image frame. Otherwise, if a large shadow region exists in the short reference image frame $\bar{I}_{sref}$, the electronic device 101 performs a residual saturated motion test 262 to check for the existence of saturated motion in the long reference image frame $\bar{I}_{lref}$. Various techniques may be used to perform the residual saturated motion test 262. FIG. 2F illustrates one example implementation of the residual saturated motion test 262 in greater detail. As shown in FIG. 2F, the electronic device 101 takes the long reference image frame $\bar{I}_{lref}$ and, at step 2621, performs saturation analysis on the long reference image frame $\bar{I}_{lref}$ to generate a saturation map 2622. The saturation map 2622 indicates which portions of the long reference image frame $\bar{I}_{lref}$ are too bright. Various techniques may be used to perform the saturation analysis.

Figure 2G:
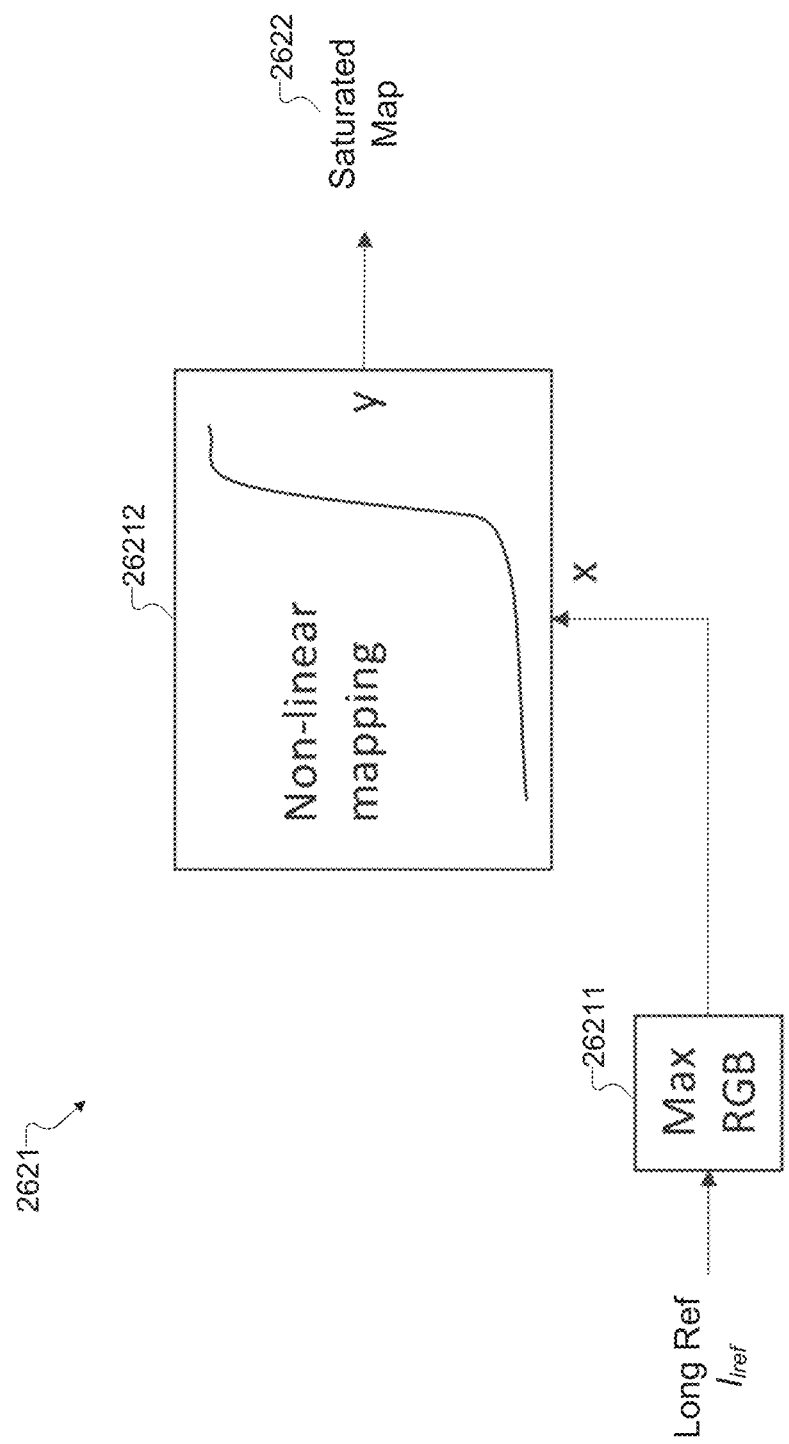

FIG. 2G illustrates one example implementation of the saturation analysis of step 2621 in greater detail. As shown in FIG. 2G, at step 26211, the electronic device 101 takes the maximum value among various channels (such as R, G, or B) for each pixel in the long reference image frame $\bar{I}_{lref}$. In general, in saturated areas of an image, the R, G, and B values are all high, and step 26211 selects the maximum value. At step 26212, the electronic device 101 applies a nonlinear mapping function to the maximum value for each pixel. In some embodiments, the mapping function can be given by the following:

$$1 - \exp\left(-\frac{\max(0, x - 0.9)^2}{0.05^2}\right) \quad (15)$$

The electronic device 101 generates the saturation map 2622 by applying the mapping function to each pixel.

Returning to FIG. 2F, the electronic device 101 also obtains the long blended motion map $W_L$ from the deghosting operation 240b and inverts the motion map $W_L$, such as by subtracting each value from a value of one. This helps to align the motion map $W_L$ with the numerical convention of the saturation map 2622. For example, 0 may indicate motion and 1 may indicate no motion in the motion map $W_L$, so inverting the motion map $W_L$ results in 1 indicating motion and 0 indicating no motion. In the saturation map 2622, 1 may indicate saturation and 0 may indicate no saturation. At step 2623, the electronic device 101 multiplies the motion map $W_L$ and the saturation map 2622 pixel-wise to obtain a saturated motion map 2624. In the saturated motion map, values close to 1 may indicate that there is motion in a saturated area, and values close to 0 may indicate that there is no motion in a saturated area.

At step 2625, the electronic device 101 performs a morphological open function on the saturated motion map 2624, which is a filtering operation to reduce noise. At step 2626, the electronic device 101 binarizes the saturated motion map 2624 based on a predetermined threshold value. In binarization, values in the saturated motion map 2624 that are below the threshold are assigned a new value of 0, and values in the saturated motion map 2624 that are above the threshold are assigned a new value of 1. At step 2627, the values of the binarized saturated motion map 2624 are added together to obtain a saturated motion size value 2628 that indicates how much area of the long reference image frame $\bar{I}_{lref}$ includes saturated motion.

At step 2629, the electronic device 101 determines if the saturated motion size value 2628 is greater than a predetermined threshold value (such as 20). If the saturated motion size value 2628 is not greater than the threshold value, it is considered that there is not a large amount of residual saturated motion in the long reference image frame $\bar{I}_{lref}$, and thus the long reference image frame $\bar{I}_{lref}$ can be used as the reference image frame. Otherwise, if the saturated motion size value 2628 is greater than the threshold value, it is considered that there is a large amount of residual saturated motion in the long reference image frame $\bar{I}_{lref}$, and thus the long reference image frame $\bar{I}_{lref}$ is not suitable for use as the reference image frame. The next operation depends on whether the process 260a or the process 260b is being performed for the reference selection operation 260.

Returning to FIG. 2C, if the electronic device 101 determines in the residual saturated motion test 262 that there is a large amount of residual saturated motion in the long reference image frame $\bar{I}_{lref}$, neither the short reference image frame $\bar{I}_{sref}$ nor the long reference image frame $\bar{I}_{lref}$ is suitable for use as the reference image frame. Thus, the electronic device 101 may select the single-exposure blended long image frame $\bar{I}_L$ that is output after the SE-blending operation 230b as the reference image frame, where the single-exposure blended long image frame $\bar{I}_L$ is a blended image frame with a EV+0 exposure level that is suitable for use as the reference image frame.

FIG. 2D illustrates another example process 260b of the reference selection operation 260 in greater detail. The process 260b is similar to the process 260a in that both processes 260a-260b include a large shadow region test 261 and a residual saturated motion test 262. However, in FIG. 2D, the residual saturated motion test 262 is performed before the large shadow region test 261, instead of after as in FIG. 2C. The result of the process 260b can be the same as the result of the process 260a: the reference image frame is selected from the short reference image frame $\bar{I}_{sref}$, the long reference image frame $\bar{I}_{lref}$, or the single-exposure blended long image frame $\bar{I}_L$.

Returning to FIG. 2A, after the reference image frame is selected, the electronic device 101 performs an edge noise filtering operation 270. Edge noise filtering is a post-processing operation in which the electronic device 101 performs spatial denoising and edge enhancement to remove noise and improve the appearances of edges in the reference image frame. Various techniques for edge noise filtering are known in the art.

Figure 2H:
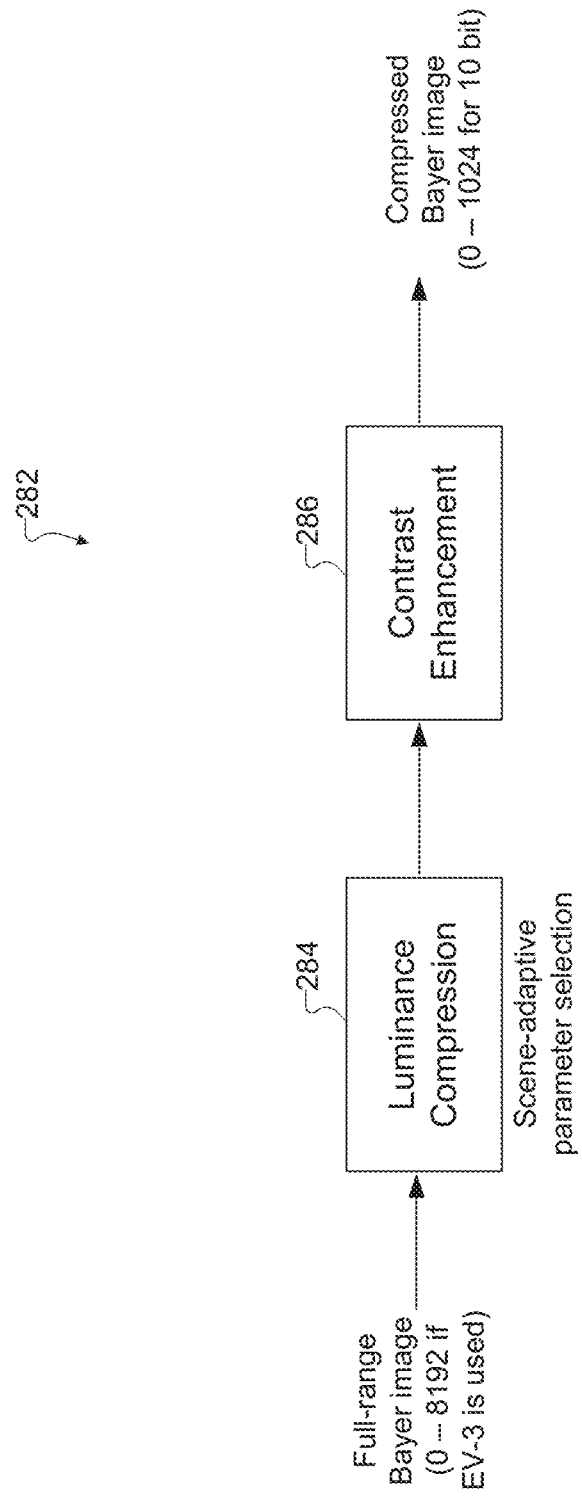

The electronic device 101 can also perform one or more image signal processing (ISP) operations 280 using the reference image frame. For example, ISP operations can include a variety of image processing functions, such as lens shading correction, white balancing, demosaicing, RGB matrix correction, gamma correction, YUV conversion, RGB conversion, and the like. In some embodiments, the ISP operations 280 can include a tone mapping operation. In order to display HDR images on LDR devices, the tone mapping operation can be used to convert higher-bit Bayer data (such as a radiance map) to standard lower-bit integer Bayer data (such as 10-bit data) in such a way that the visual impressions and details of the original real scene are faithfully reproduced. Various techniques may be used to perform the tone mapping operation. FIG. 2H illustrates one example implementation of a tone mapping operation 282 in greater detail. As shown in FIG. 2H, the tone mapping operation 282 includes a luminance compression step 284 and a contrast enhancement step 286.

In some embodiments of the luminance compression step 284, the electronic device 101 may use the following function to compress the luminance data and preserve HDR details:

$$D(\bar{I}) = (D_{max} - D_{min}) * \frac{\log(\bar{I} + \tau) - \log(\bar{I}_{min} + \tau)}{\log(\bar{I}_{max} + \tau) - \log(\bar{I}_{min} + \tau)} + D_{min} \quad (16)$$

where $I_{min}$ and $I_{max}$ represent the minimum and maximum luminances of the scene, $D_{max}$ and $D_{min}$ represent the maximum and minimum target levels, and $\tau$ controls the overall brightness of the mapped image. In some cases, $\tau$ may be automatically selected based on the assumption that the log-average luminance should be mapped to the key value k as follows:

$$k = \frac{\log(\bar{I}_{avg} + \tau) - \log(\bar{I}_{min} + \tau)}{\log(\bar{I}_{max} + \tau) - \log(\bar{I}_{min} + \tau)} \quad (17)$$

where the key value may be computed as:

$$k = k1 * k2^{(2\ \log(\bar{I}_{avg}) - \log(\bar{I}_{min}) - \log(\bar{I}_{max}))/(\log(\bar{I}_{max}) - \log(\bar{I}_{min}))} \quad (18)$$

In Equation (18), the values of k1 and k2 may be empirically determined, and the key value k may vary (such as between 0.2 and 0.8). Once the key value is known, the value i can be determined, such as by solving a nonlinear function. With the luminance compression step 284, the overall brightness is compressed to 10-bit or other lower-bit range.

In some systems, directly rendering compressed luminance data for display will result in a lack of contrast if linear quantization is used. Linear quantization groups pixels based on actual pixel values without taking into account an image's pixel distribution. A traditional technique that considers pixel distribution is histogram equalization that clusters pixels based on equally distributing pixel populations. However, histogram equalization may result in exaggeration of contrast or plain areas. To address this issue, the contrast enhancement operation 286 can be performed to interpolate cutting points in quantization using cutting points from linear quantization and histogram matching. In some embodiments, the contrast enhancement operation 286 uses a highly-efficient recursive binary cut approach. The contrast enhancement operation 286 strikes a balance between linear quantization and histogram equalization.

Figure 2I:
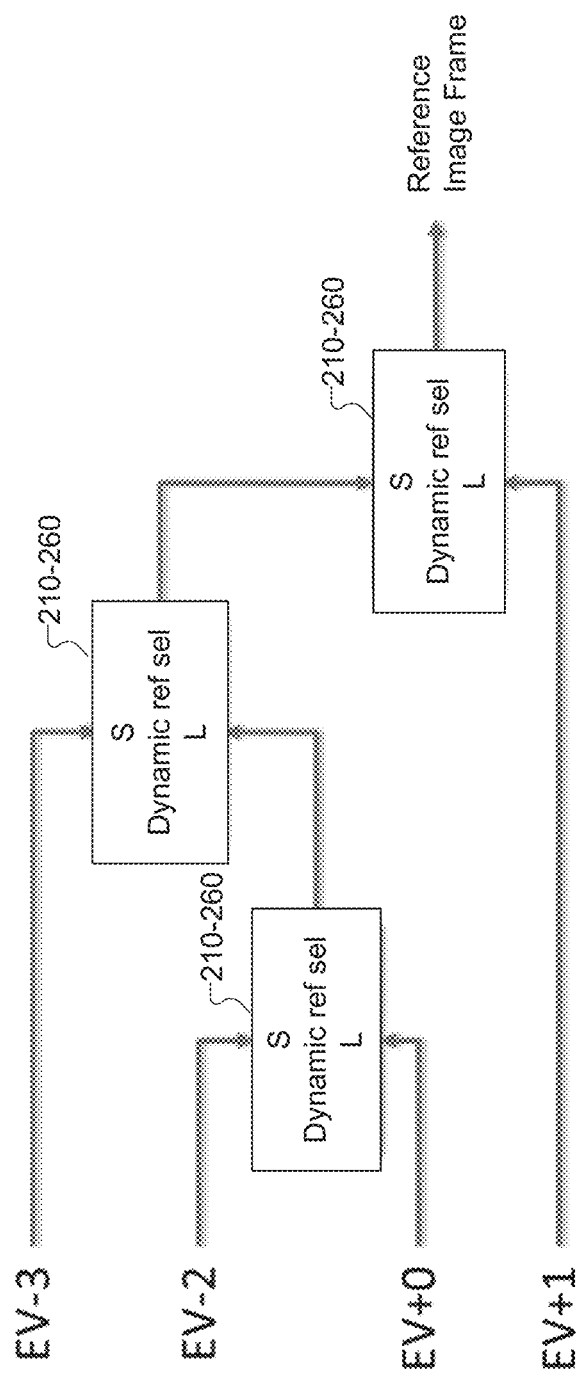

As described above, the process 200 is performed using image frames captured at two exposure levels, namely short and long. In some embodiments, the number of exposure levels represented in the captured image frames could be more than two exposure levels. In such cases, an iterative process may be used for the operations 210a-210b, 220a-220b, 230a-230b, 240a-240b, 250a-250b, and 260. For example, FIG. 2I illustrates one example implementation in which the operations 210-260 are performed iteratively for image frames captured at multiple exposure levels. As shown in FIG. 2I, the image frames are initially captured at four exposure levels (such as EV−3, EV−2, EV+0, and EV+1). Pairs of exposure levels are selected as short and long exposure levels, and the operations 210-260 are performed in one iteration on the image frames at that pair of exposure levels. The results of the iteration are paired with image frames at another exposure level, and the operations 210-260 are performed in another iteration. This process is repeated until a final iteration results in the final selection of the reference image frame.

Although FIGS. 2A, 2B, 2C, 2D, 2E, 2F, 2G, 2H, and 2I illustrate one example of a process 200 for dynamic selection of a reference image frame, various changes may be made to these figures. For example, while the process 200 is shown as selecting one reference image frame, other embodiments could result in the selection of more than one reference image frame. Also, the operations of the process 200 can be performed by any suitable component(s) of an electronic device 101 or other device, including the processor 120 of the electronic device 101 or by an image sensor 180 of the electronic device 101.

The process 200 has been described above in conjunction with captured image frames in the Bayer ("raw format") domain. The same or similar processing can be performed for image frames in other domains, such as in the YUV ("visual format") domain. However, unlike in the Bayer domain, brightness matching using the equalization operation 210a cannot be achieved using a trivial multiplication operation due to the lack of linearity in the YUV domain. Instead, a histogram matching (with a long frame) operation can be used.

Figure 3B:
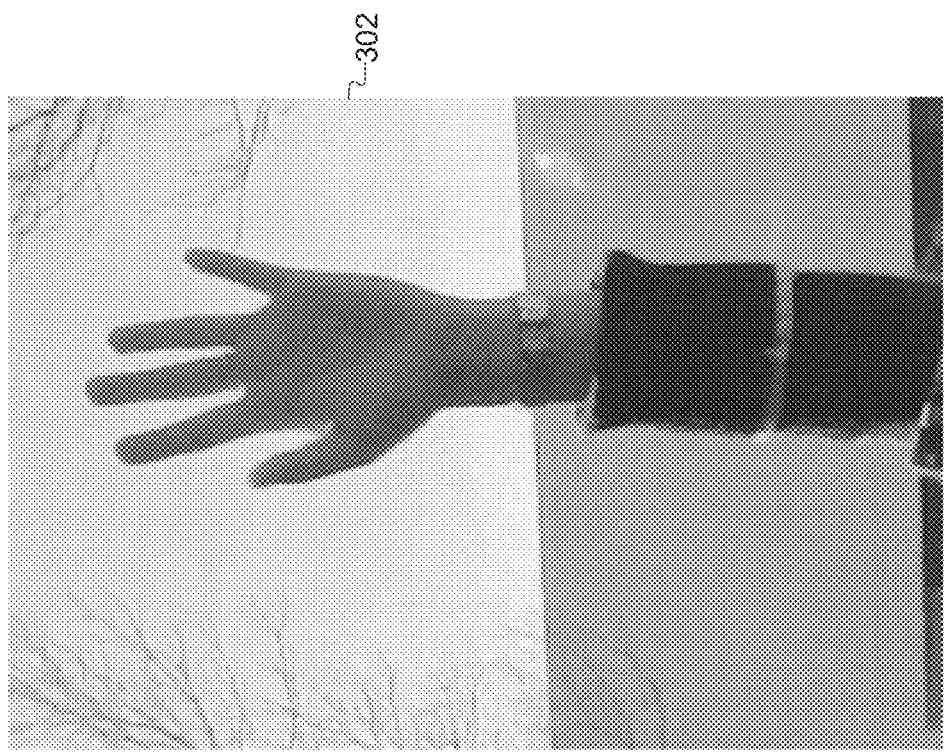
FIGS. 3A and 3B illustrate examples of benefits that can be realized using dynamic selection of a reference image frame in accordance with this disclosure.
Figure 3A:
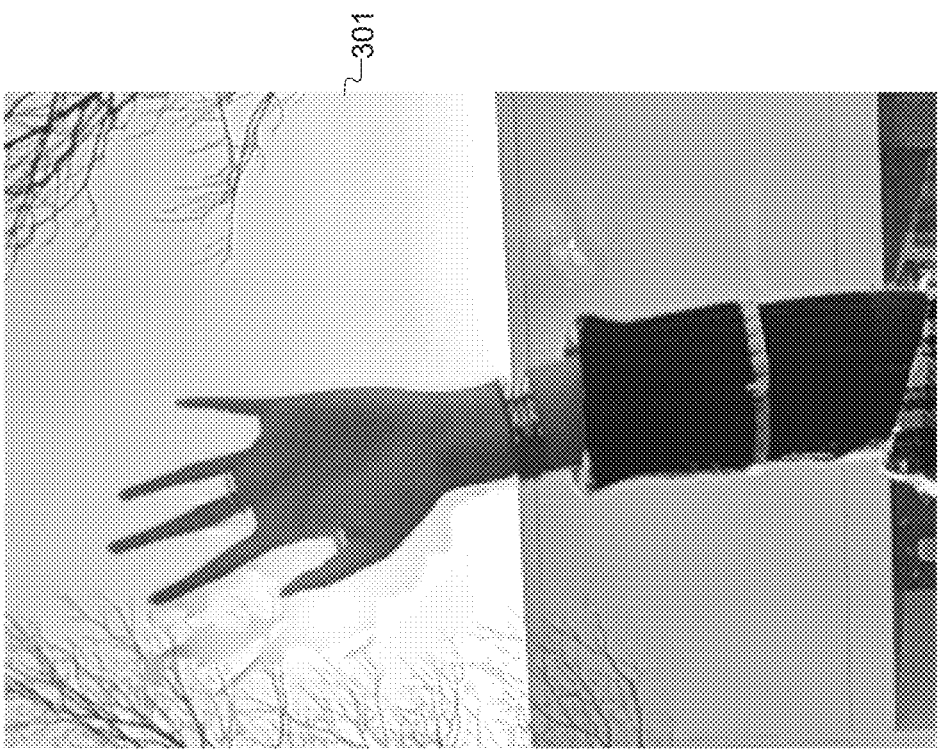

FIGS. 3A and 3B illustrate examples of benefits that can be realized using dynamic selection of a reference image frame in accordance with this disclosure. In particular, FIGS. 3A and 3B depict a comparison between an image 301 of a scene captured using conventional image processing techniques and an image 302 of the same scene captured using one of the embodiments disclosed above.

As shown in FIG. 3A, the image 301 was captured and processed using a conventional HDR operation. As evident by FIG. 3A, the image 301 includes significant ghost artifacts resulting from a moving hand in a saturated area. In contrast, the image 302 in FIG. 3B was captured and processed using a short reference image frame that was selected using the process 200 as described above. The resulting image 302 provides superior HDR results and does not exhibit any ghost artifacts in the moving hand.

Although FIGS. 3A and 3B illustrate one example of benefits that can be realized using dynamic selection of a reference image frame, various changes may be made to FIGS. 3A and 3B. For example, FIGS. 3A and 3B are merely meant to illustrate one example of the type of benefits that may be obtained using dynamic selection of a reference image frame. Images of scenes vary widely, and other results may be obtained depending on the scene and the implementation.

Figure 4:
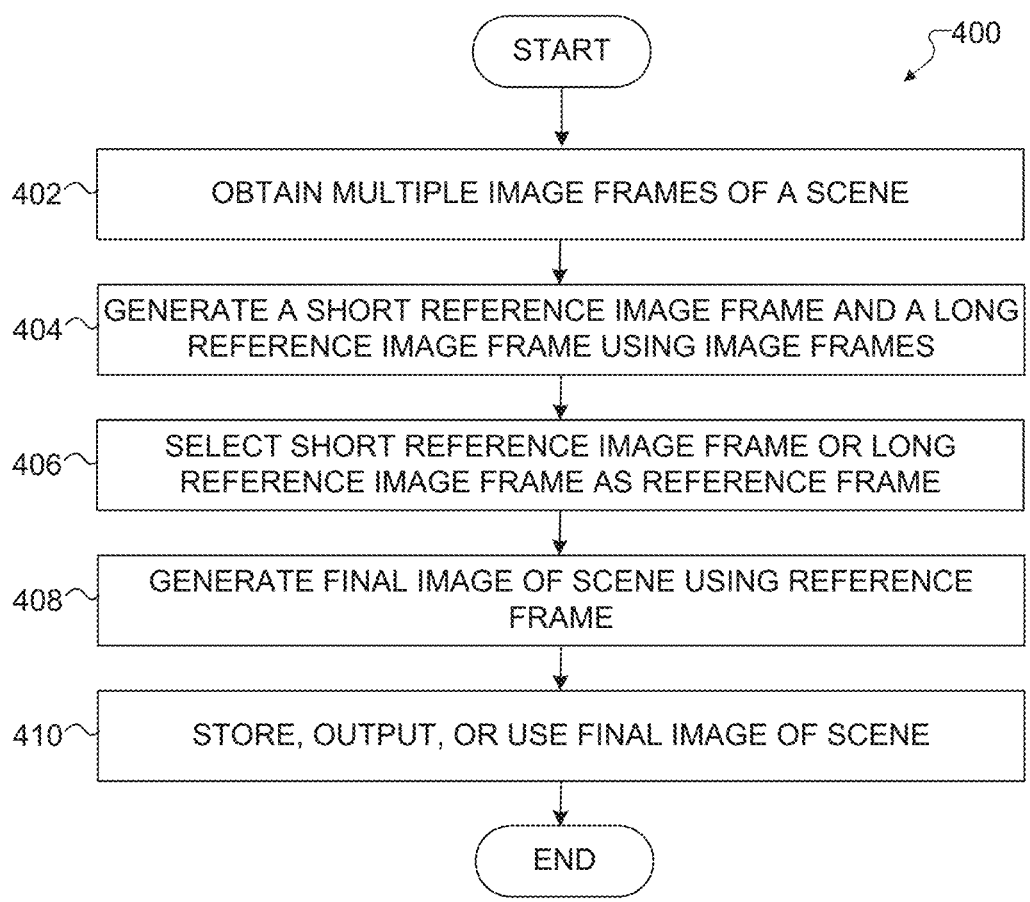
FIG. 4 illustrates an example method for dynamic selection of a reference image frame in accordance with this disclosure.

FIG. 4 illustrates an example method 400 for dynamic selection of a reference image frame in accordance with this disclosure. For ease of explanation, the method 400 shown in FIG. 4 is described as involving the performance of the process 200 using the electronic device 101 shown in FIG. 1. However, the method 400 shown in FIG. 4 could be used with any other suitable electronic device and in any suitable system.

As shown in FIG. 4, multiple image frames of a scene are obtained using at least one image sensor of an electronic device at step 402. This could include, for example, the processor 120 of the electronic device 101 receiving a capture request and causing at least one camera (sensor 180) to capture short and long image frames as in the capture operation 202. The multiple image frames include a plurality of short image frames at a first exposure level and a plurality of long image frames at a second exposure level longer than the first exposure level.

A short reference image frame and a long reference image frame are generated using the multiple image frames at step 404. This could include, for example, the processor 120 of the electronic device 101 performing the equalization operations 210a-210b, the deghosting operations 220a-220b, the SE blending operations 230a-230b, the deghosting operations 240a-240b, and the ME blending operations 250a-250b to generate the short reference image frame $\overline{I}_{sref}$ and the long reference image frame $\overline{I}_{lreg}$. The short reference image frame or the long reference image frame is selected as a reference frame at step 406. This could include, for example, the processor 120 of the electronic device 101 selecting the reference frame by performing the reference selection operation 260, which can include either the process 260a or the process 260b. The selection can be based on an amount of saturated motion in the long image frame and an amount of a shadow region in the short image frame.

A final image of the scene is generated using the reference frame at step 408. This could include, for example, the processor 120 of the electronic device 101 performing one or more ISP operations 280, which can include a tone mapping operation 282. Note that any other desired image processing operations may also occur here to produce the final image of the scene. The final image of the scene can be stored, output, or used in some manner at step 410. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 4 illustrates one example of a method 400 for dynamic selection of a reference image frame, various changes may be made to FIG. 4. For example, while shown as a series of steps, various steps in FIG. 4 could overlap, occur in parallel, occur in a different order, or occur any number of times.

It should be noted that while various operations are described above as being performed using one or more devices, those operations can be implemented in any suitable manner. For example, each of the functions in the electronic device 101 or server 106 can be implemented or supported using one or more software applications or other software instructions that are executed by at least one processor 120 of the electronic device 101 or server 106. In other embodiments, at least some of the functions in the electronic device 101 or server 106 can be implemented or supported using dedicated hardware components. In general, the operations of each device can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, using at least one image sensor of an electronic device, multiple image frames of a scene, the multiple image frames comprising a plurality of short image frames at a first exposure level and a plurality of long image frames at a second exposure level longer than the first exposure level;
    generating a short reference image frame and a long reference image frame using the multiple image frames;
    selecting, using a processor of the electronic device, the short reference image frame or the long reference image frame as a reference frame, wherein the selection is based on an amount of saturated motion in the long reference image frame and an amount of a shadow region in the short reference image frame; and generating a final image of the scene using the reference frame.

2. The method of claim 1, wherein selecting the short reference image frame or the long reference image frame comprises determining the amount of saturated motion in the long reference image frame by:
   generating a saturation map based on the long reference image frame;
   multiplying the saturation map and a motion map of the long reference image frame to obtain a saturated motion map;
   determining a saturated motion size value using the saturated motion map; and
   comparing the saturated motion size value to a predetermined threshold value.

3. The method of claim 1, wherein selecting the short reference image frame or the long reference image frame comprises determining an existence of a large shadow region in the short reference image frame by:
   determining a median value of luminance values of the short reference image frame;
   comparing the median value to a first predetermined threshold value to determine if the short reference image frame is too dark; and
   comparing an ISO value of the short reference image frame to a second predetermined threshold value to determine if the short reference image frame is too noisy.

4. The method of claim 1, wherein generating the short reference image frame and the long reference image frame using the multiple image frames comprises:
   equalizing brightness levels of the multiple image frames;
   deghosting the multiple image frames;
   blending the plurality of short image frames to generate a blended short image frame and blending the plurality of long image frames to generate a blended long image frame;
   deghosting the blended short image frame and the blended long image frame;
   blending the blended short image frame and the blended long image frame using the blended short image frame as a primary image to obtain the short reference image frame; and
   blending the blended short image frame and the blended long image frame using the blended long image frame as a primary image to obtain the long reference image frame.

5. The method of claim 1, further comprising:
   reducing motion noise in the short reference image frame by increasing an exposure level of the short reference image frame by a factor of A; and
   reducing an ISO gain of the short reference image frame by a factor of 1/A;
   wherein A is a power of two.

6. The method of claim 1, wherein generating the final image of the scene using the reference frame comprises:
   performing a tone mapping operation on the final image, wherein the tone mapping operation comprises luminance compression of the final image.

7. The method of claim 1, wherein the multiple image frames are captured in a raw format.

8. The method of claim 1, wherein:
the multiple image frames are captured in a YUV format; and
the method further comprises:
   performing histogram matching using the plurality of short image frames and the plurality of long image frames to generate a plurality of synthesized long image frames; and
   blending the synthesized long image frames and the plurality of short image frames to generate a blended short image frame.

9. An electronic device comprising:
at least one image sensor; and
at least one processing device configured to:
   obtain, using the at least one image sensor, multiple image frames of a scene, the multiple image frames comprising a plurality of short image frames at a first exposure level and a plurality of long image frames at a second exposure level longer than the first exposure level;
   generate a short reference image frame and a long reference image frame using the multiple image frames;
   select the short reference image frame or the long reference image frame as a reference frame, wherein the selection is based on an amount of saturated motion in the long reference image frame and an amount of a shadow region in the short reference image frame; and
   generate a final image of the scene using the reference frame.

10. The electronic device of claim 9, wherein:
to select the short reference image frame or the long reference image frame, the at least one processing device is configured to determine the amount of saturated motion in the long reference image frame; and
to determine the amount of saturated motion in the long reference image frame, the at least one processing device is configured to:
   generate a saturation map based on the long reference image frame;
   multiply the saturation map and a motion map of the long reference image frame to obtain a saturated motion map;
   determine a saturated motion size value using the saturated motion map; and
   compare the saturated motion size value to a predetermined threshold value.

11. The electronic device of claim 9, wherein:
to select the short reference image frame or the long reference image frame, the at least one processing device is configured to determine an existence of a large shadow region in the short reference image frame; and
to determine the existence of the large shadow region in the short reference image frame, the at least one processing device is configured to:
   determine a median value of luminance values of the short reference image frame;
   compare the median value to a first predetermined threshold value to determine if the short reference image frame is too dark; and
   compare an ISO value of the short reference image frame to a second predetermined threshold value to determine if the short reference image frame is too noisy.

12. The electronic device of claim 9, wherein, to generate the short reference image frame and the long reference image frame using the multiple image frames, the at least one processing device is configured to:
  equalize brightness levels of the multiple image frames;
  deghost the multiple image frames;
  blend the plurality of short image frames to generate a blended short image frame and blending the plurality of long image frames to generate a blended long image frame;
  deghost the blended short image frame and the blended long image frame;
  blend the blended short image frame and the blended long image frame using the blended short image frame as a primary image to obtain the short reference image frame; and
  blend the blended short image frame and the blended long image frame using the blended long image frame as a primary image to obtain the long reference image frame.

13. The electronic device of claim 9, wherein the at least one processing device is further configured to:
  reduce motion noise in the short reference image frame by increasing an exposure level of the short reference image frame by a factor of A; and
  reduce an ISO gain of the short reference image frame by a factor of 1/A; and
  wherein A is a power of two.

14. The electronic device of claim 9, wherein:
  to generate the final image of the scene using the reference frame, the at least one processing device is configured to perform a tone mapping operation on the final image; and
  the tone mapping operation comprises luminance compression of the final image.

15. The electronic device of claim 9, wherein the multiple image frames comprise image frames in a raw format.

16. The electronic device of claim 9, wherein:
  the multiple image frames comprise image frames in a YUV format; and
  the at least one processing device is further configured to:
    perform histogram matching using the plurality of short image frames and the plurality of long image frames to generate a plurality of synthesized long image frames; and
    blend the synthesized long image frames and the plurality of short image frames to generate a blended short image frame.

17. A non-transitory machine-readable medium containing instructions that when executed cause at least one processor of an electronic device to:
  obtain multiple image frames of a scene that are captured using at least one image sensor of the electronic device, the multiple image frames comprising a plurality of short image frames at a first exposure level and a plurality of long image frames at a second exposure level longer than the first exposure level;
  generate a short reference image frame and a long reference image frame using the multiple image frames;
  select the short reference image frame or the long reference image frame as a reference frame, wherein the selection is based on an amount of saturated motion in the long reference image frame and an amount of a shadow region in the short reference image frame; and
  generate a final image of the scene using the reference frame.

18. The non-transitory machine-readable medium of claim 17, wherein the instructions that when executed cause the at least one processor to select the short reference image frame or the long reference image frame comprise:
  instructions that when executed cause the at least one processor to determine the amount of saturated motion in the long reference image frame by:
    generating a saturation map based on the long reference image frame;
    multiplying the saturation map and a motion map of the long reference image frame to obtain a saturated motion map;
    determining a saturated motion size value using the saturated motion map; and
    comparing the saturated motion size value to a predetermined threshold value.

19. The non-transitory machine-readable medium of claim 17, wherein the instructions that when executed cause the at least one processor to select the short reference image frame or the long reference image frame comprise:
  instructions that when executed cause the at least one processor to determine an existence of a large shadow region in the short reference image frame by:
    determining a median value of luminance values of the short reference image frame;
    comparing the median value to a first predetermined threshold value to determine if the short reference image frame is too dark; and
    comparing an ISO value of the short reference image frame to a second predetermined threshold value to determine if the short reference image frame is too noisy.

20. The non-transitory machine-readable medium of claim 17, wherein the instructions that when executed cause the at least one processor to generate the short reference image frame and the long reference image frame using the multiple image frames comprise:
  instructions that when executed cause the at least one processor to:
    equalize brightness levels of the multiple image frames;
    deghost the multiple image frames;
    blend the plurality of short image frames to generate a blended short image frame and blending the plurality of long image frames to generate a blended long image frame;
    deghost the blended short image frame and the blended long image frame;
    blend the blended short image frame and the blended long image frame using the blended short image frame as a primary image to obtain the short reference image frame; and
    blend the blended short image frame and the blended long image frame using the blended long image frame as a primary image to obtain the long reference image frame.

* * * * *